United States Patent
Lee et al.

(10) Patent No.: US 9,461,600 B2
(45) Date of Patent: Oct. 4, 2016

(54) METHOD FOR HIGH-FREQUENCY AMPLIFIER USING POWER GAIN-BOOSTING TECHNIQUE

(71) Applicant: KOREA ADVANCED INSTITUTE OF SCIENCE AND TECHNOLOGY, Yuseong-gu, Daejeon (KR)

(72) Inventors: Sang-Gug Lee, Daejeon (KR); Bao Lam Huu, Daejeon (KR); Suna Kim, Daejeon (KR); Jeong Seon Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/590,253

(22) Filed: Jan. 6, 2015

(65) Prior Publication Data

US 2015/0333707 A1 Nov. 19, 2015

(30) Foreign Application Priority Data

May 14, 2014 (KR) .......... 10-2014-0058024

(51) Int. Cl.
*H03F 3/191* (2006.01)
*H03F 3/193* (2006.01)
(Continued)

(52) U.S. Cl.
CPC .......... *H03F 3/193* (2013.01); *G06F 17/5045* (2013.01); *G06F 17/5063* (2013.01);
(Continued)

(58) Field of Classification Search
CPC ........ H03F 3/191; H03F 3/193; H03F 3/195; H03F 2200/222; H03F 2200/387
USPC ..................................... 330/2, 302
See application file for complete search history.

(56) References Cited

U.S. PATENT DOCUMENTS 6,504,434 B2  1/2003  Catala
7,439,802 B2 * 10/2008  Tsai .......... H03F 1/26
                                       330/109

FOREIGN PATENT DOCUMENTS

KR  10-1998-0077243  11/1998
KR  10-0422493       3/2004
KR  10-2012-0056233  6/2012

OTHER PUBLICATIONS

Gupta, Madhu S., "Power Gain in Feedback Amplifiers, a Classic Revisited," *IEEE Transactions on Microwave Theory and Techniques*, 1992, vol. 40(5), pp. 864-879.
(Continued)

*Primary Examiner* — Steven J Mottola
(74) *Attorney, Agent, or Firm* — Womble Carlyle Sandridge & Rice LLP

(57) ABSTRACT

The present invention provides a power gain-boosting technique for an amplifier in order to compensate for the decrease of $G_{mag}$ in a transistor at high frequencies. A power gain-boosting technique of the present invention comprises the steps of: finding the Maximum Unilateral Gain or Mason's Invariant U of a transistor; designing a linear, lossless, reciprocal network embedding the transistor so that the final equivalent S-, Y-, or Z-parameters satisfy the condition:

$$\frac{S_{21}}{S_{12}} = \frac{Y_{21}}{Y_{12}} = \frac{Z_{21}}{Z_{12}} = -[(2U-1) + 2\sqrt{U(U-1)}];$$

embedding the transistor into the linear, lossless, reciprocal network; and constructing simultaneous conjugate matching.

8 Claims, 7 Drawing Sheets

(51) Int. Cl.
*H03F 1/08* (2006.01)
*G06F 17/50* (2006.01)
*H03F 1/56* (2006.01)
*H03H 7/38* (2006.01)

(52) U.S. Cl.
CPC ............... *H03F1/086* (2013.01); *H03F 1/56* (2013.01); *G06F 2217/02* (2013.01); *G06F 2217/06* (2013.01); *G06F 2217/08* (2013.01); *G06F 2217/78* (2013.01); *H03F 2200/222* (2013.01); *H03F 2200/294* (2013.01); *H03F 2200/387* (2013.01); *H03H 7/38* (2013.01)

(56) References Cited

OTHER PUBLICATIONS

Singhakowinta, A., et al., "On Linear Two-Port Amplifiers," *IEEE Transactions on Circuit Theory*, 1964, vol. 11(1), p. 169.

"Power Amplifier," *EP&C*, Jun. 30, 2002, pp. 64-77. (Article cited in Korean Office Action issued Nov. 20, 2015. No English translation available.).

* cited by examiner

METHOD FOR HIGH-FREQUENCY AMPLIFIER USING POWER GAIN-BOOSTING TECHNIQUE

BACKGROUND OF THE INVENTION

1. Field of the Invention

The present invention relates to a design method for high frequency amplifiers using a power gain-boosting technique and the high frequency amplifiers using the method.

2. Description of the Related Art

At microwave frequencies, the intrinsic gain of an amplifier is insufficient due to parasitics, high loss, low device $f_{max}$, etc. Therefore a gain-boosting technique is needed.

Figure 1:
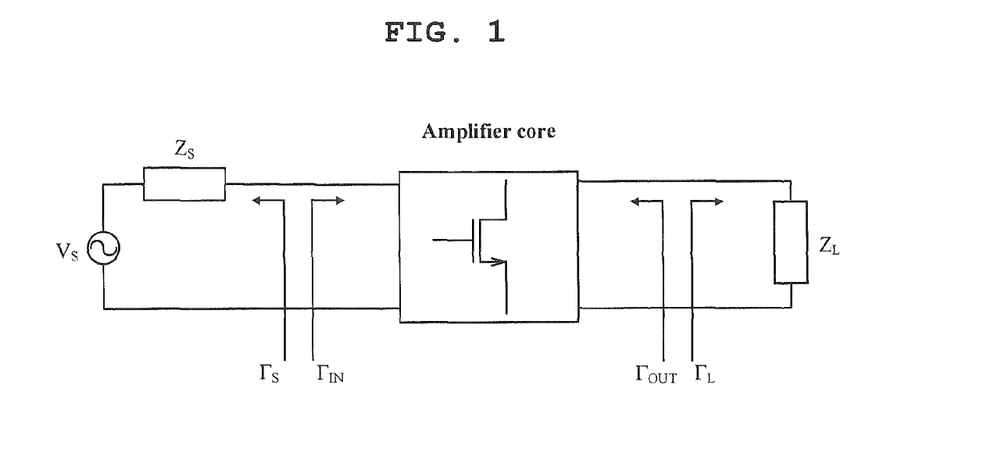
FIG. 1 shows a general configuration of a high frequency amplifier.

Consider the configuration of a high frequency amplifier circuit as shown in FIG. 1. Assume the amplifier core which can be a particular transistor has the following S-parameters:

$$\begin{bmatrix} S_{11} & S_{12} \\ S_{21} & S_{22} \end{bmatrix} \quad (1)$$

The Transducer Gain $G_T$ of the above circuit is defined as the ratio of the power delivered to the load to the power available from the source, and is given as:

$$G_T = \frac{1-|\Gamma_S|^2}{|1-\Gamma_{IN}\Gamma_S|^2}|S_{21}|^2\frac{1-|\Gamma_L|^2}{|1-S_{22}\Gamma_L|^2} \quad (2)$$

Figure 2:
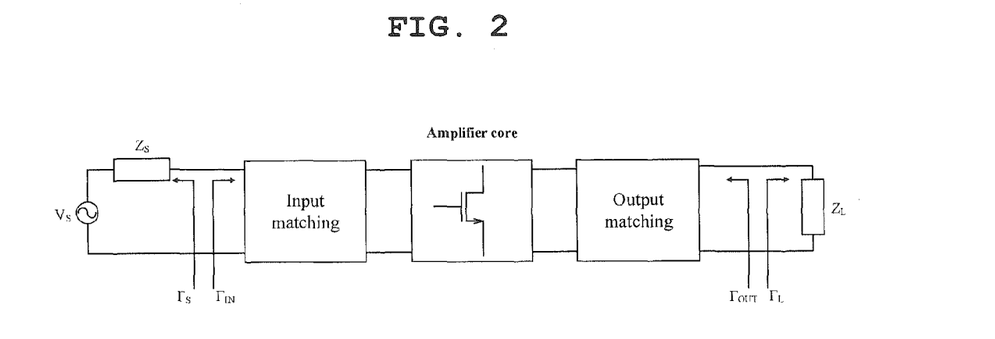
FIG. 2 illustrates general simultaneous conjugate matching networks for the input and output of the high frequency amplifier.

Subsequently, the Maximum Available Gain $G_{mag}$ is defined as the Transducer Gain of an amplifier when both the input and the output are simultaneously conjugately matched as shown FIG. 2:

$$\Gamma_S = \Gamma_{IN}^* \quad (3a)$$

$$\Gamma_L = \Gamma_{OUT}^* \quad (3b)$$

The equation for $G_{mag}$ in terms of S-parameters is rather complicated. However, $G_{mag}$ can be expressed more simply using the concept of the stability factor which is described next.

The stability factor k of an amplifier is expressed as:

$$k = \frac{1-|S_{11}|^2-|S_{22}|^2+|\Delta|^2}{2|S_{12}S_{21}|} \quad (4)$$

where $$\Delta = S_{11}S_{22}-S_{12}S_{21}. \quad (5)$$

An amplifier is said to be unconditionally stable if and only if the following two conditions are satisfied:

$$|\Delta|<1 \quad (6)$$

$$k \geq 1 \quad (7)$$

Otherwise, it is conditionally stable, or potentially unstable. Simultaneous conjugate matching is only possible when the amplifier is unconditionally stable, i.e. when $|\Delta|<1$ and $k\geq1$. For most practical transistors: $|\Delta|<1$, therefore, usually only k alone is enough to check for stability.

The Maximum Available Gain can then be expressed in terms of k:

$$G_{mag} = \left|\frac{S_{21}}{S_{12}}\right|\left(k-\sqrt{k^2-1}\right) \quad (8)$$

When k<1, $G_{mag}$ is nonexistent; instead, another gain which is defined as $$\left|\frac{S_{21}}{S_{12}}\right|$$

is used. This gain is called Maximum Stable Gain $G_{msg}$, which is only a figure of merit. As a result, a plot of $G_{mag}$ will commonly also include $G_{msg}$ to attend to the case when k<1. The denotation $G_{msg}$~$G_{mag}$ is therefore used for this kind of plot.

The Maximum Unilateral Gain U, or the Mason's Invariant, is defined as the Maximum Available Gain of a transistor after it has been unilateralized, i.e. when reverse isolation is infinite, or when there is no coupling from the output back to the input ($S_{12}=Y_{12}=Z_{12}=0$). In other words $$U = \lim_{S_{12}\to 0}(G_{mag}).$$

The original expression of U established by Mason is:

$$U = \frac{|Z_{21}-Z_{12}|^2}{4[\text{Re}(Z_{11})\text{Re}(Z_{22})-\text{Re}(Z_{12})\text{Re}(Z_{21})]} \quad (9)$$

where $Z_{11}$, $Z_{12}$, $Z_{21}$, and $Z_{22}$ are the Z-parameters of the transistor.

When the amplifier is embedded into any linear, lossless, reciprocal network, U remains constant. U decreases with frequency. When U equals unity, the transistor is said to become passive and no longer function as an amplifying unit. The frequency at which U=1 is called the Maximum Oscillation Frequency $f_{max}$, which sets the limit in which the transistor can be of use.

Figure 3:
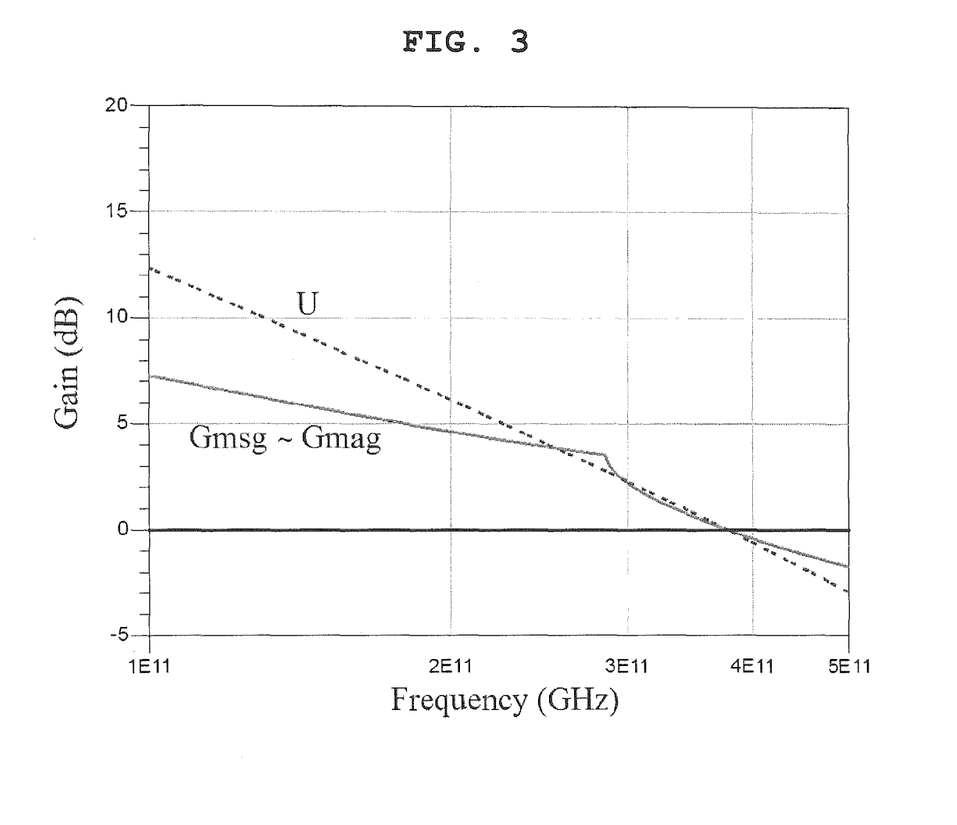
FIG. 3 shows a general plot of $G_{msg}$-$G_{mag}$ and U versus frequency for a particular transistor.

Generally, the feedback from the output to the input due to poor reverse isolation decreases the intrinsic gain of the transistor such that $G_{msg}$~$G_{mag}$ is lower than U. A plot of $G_{msg}$~$G_{mag}$ and U versus frequency for a particular transistor is shown in FIG. 3. It can be seen that at high frequencies, $G_{mag}$ drops significantly.

SUMMARY OF THE INVENTION

The present invention provides a power gain-boosting technique for an amplifier in order to compensate for the decrease of $G_{mag}$ in a transistor at high frequencies.

A power gain-boosting technique of the present invention comprises the steps of: finding the Maximum Unilateral Gain or Mason's Invariant U of a transistor; designing a linear, lossless, reciprocal network embedding the transistor so that the final equivalent S-, Y-, or Z-parameters satisfy the condition:

$$\frac{S_{21eq}}{S_{12eq}} = \frac{Y_{21eq}}{Y_{12eq}} = \frac{Z_{21eq}}{Z_{12eq}} = -[(2U-1) + 2\sqrt{U(U-1)}],$$

wherein $S_{12eq}$ and $S_{21eq}$ represent S-parameters of the linear, lossless, reciprocal network embedding the transistor, $Y_{12eq}$ and $Y_{21eq}$ represent Y-parameters of the linear, lossless, reciprocal network embedding the transistor, and $Z_{12eq}$ and $Z_{21eq}$ represent Z-parameters of the linear, lossless, reciprocal network embedding the transistor; embedding the transistor into the linear, lossless, reciprocal network; and lastly, constructing simultaneous conjugate matching.

According to another embodiment of the present invention, a design procedure of an amplifier comprises the steps of: finding intrinsic Z-parameters of a transistor; finding the Maximum Unilateral Gain or Mason's Invariant U of the transistor; calculating $G_{mag(max)}$ which satisfies the condition: $(2U-1)+2\sqrt{U(U-1)}=-A$; decreasing the value of $|A|$ from the previous step until the stability factor k is slightly higher than 1, according to the following equation:

$$U = \frac{\left|\frac{S_{21}}{S_{12}} - 1\right|^2}{2k\left|\frac{S_{21}}{S_{12}}\right| - 2\text{Re}\left(\frac{S_{21}}{S_{12}}\right)};$$

designing a linear, lossless, reciprocal network embedding the transistor such that $$\frac{S_{21eq}}{S_{12eq}} = \frac{Y_{21eq}}{Y_{12eq}} = \frac{Z_{21eq}}{Z_{12eq}}$$

equals the value of A from the previous step; embedding the transistor into the linear, lossless, reciprocal network; and constructing simultaneous conjugate matching.

In accordance with the present invention, the power gain-boosting technique can boost the Maximum Available Gain up to 6 dB higher than the Mason's Invariant so that the amplifier can have higher gain for practical applications.

DETAILED DESCRIPTION OF THE PREFERRED EMBODIMENTS

The present invention introduces the concept of gain-boosting technique. From Madhu S. Gupta ("Power Gain in Feedback Amplifiers, a Classic Revisited," *IEEE Trans. Microw. Theory Tech.*, vol. 40, no. 5, pp. 864-879, 1992.), the Maximum Unilateral Gain U of a transistor can be expressed alternatively in terms of the S-parameters and the stability factor as:

$$U = \frac{\left|\frac{S_{21}}{S_{12}} - 1\right|^2}{2k\left|\frac{S_{21}}{S_{12}}\right| - 2\text{Re}\left(\frac{S_{21}}{S_{12}}\right)} \quad (10)$$

where $$\frac{S_{21}}{S_{12}} = \frac{Y_{21}}{Y_{12}} = \frac{Z_{21}}{Z_{12}}$$

with $Y_{12}$, $Y_{21}$ being the Y-parameters of the transistor.

Let $A = \frac{S_{21eq}}{S_{12eq}} = \frac{Y_{21eq}}{Y_{12eq}} = \frac{Z_{21eq}}{Z_{12eq}}$, and $x = k - \sqrt{k^2 - 1}$, then $U = \frac{|A-1|^2}{2k|A| - 2\text{Re}(A)}$, and $G_{mag} = |A|x$.

Now if $|A|$ is replaced by $$\frac{G_{mag}}{x},$$

and Re(A) by $$\frac{G_{mag}}{x}\cos(\varphi),$$

where φ is the phase of A, then equation 10 can be rewritten as:

$$U = \frac{|A-1|^2}{2k|A| - 2\text{Re}(A)} = \frac{\frac{G_{mag}^2}{x^2} - 2\frac{G_{mag}}{x}\cos(\varphi) + 1}{\left(\frac{x^2+1}{x}\right)\left(\frac{G_{mag}}{x}\right) - \frac{2G_{mag}}{x}\cos(\varphi)} \quad (11)$$

which can be expanded into:

$$G_{mag}^2 - G_{mag}[Ux^2 - 2x\cos(\phi)(U-1) + U] + x^2 = 0 \quad (12)$$

Equation 12 can be considered as a quadratic equation with the unknown being $G_{mag}$. As a result, there are two solutions to the equation 12:

$$G_{mag1,2} = \frac{1}{2}\Big[Ux^2 - 2x\cos(\varphi)(U-1) + \quad (13)$$
$$U \pm \sqrt{[Ux^2 - 2x\cos(\varphi)(U-1) + U]^2 - 4x^2}\Big]$$

The greater solution will therefore be the maximum gain:

$$G_{mag1} = \frac{1}{2}\Big[Ux^2 - 2x\cos(\varphi)(U-1) + \quad (14)$$
$$U + \sqrt{[Ux^2 - 2x\cos(\varphi)(U-1) + U]^2 - 4x^2}\Big]$$

Since U is a constant, it is reasonable to consider $G_{mag1}$ as a function of two variables: x and $\phi$. A three-dimensional graph of $G_{mag1}$ with respect to x and $\phi$ is plotted as in FIG. 4.

Figure 4:
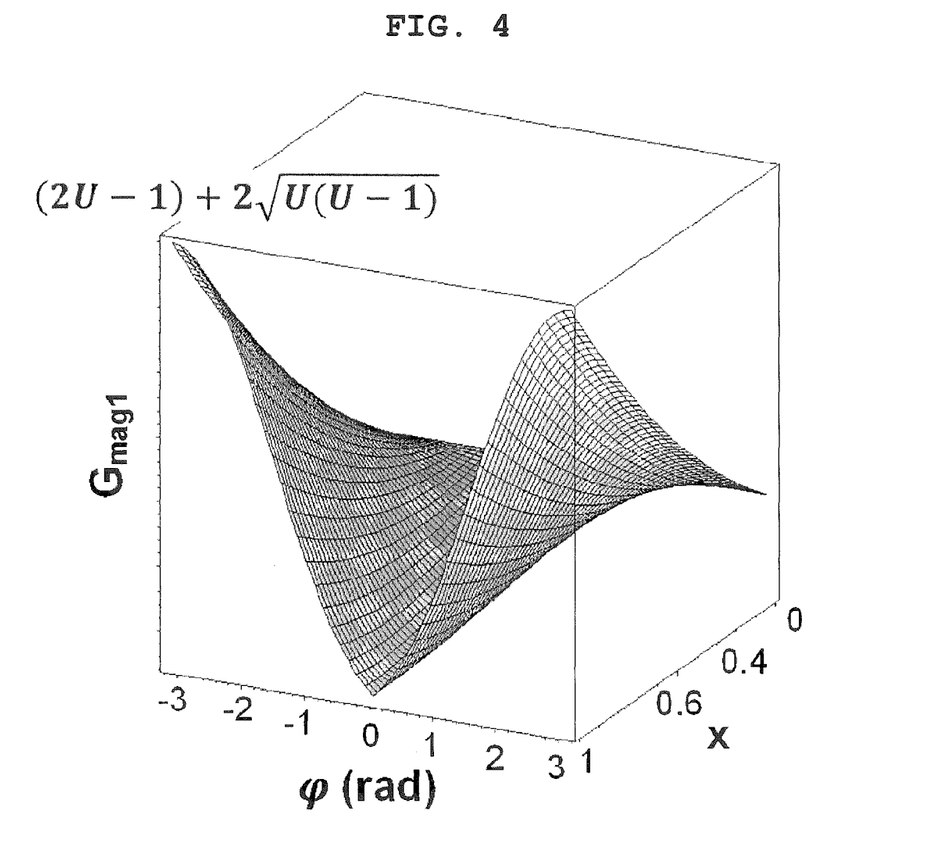
FIG. 4 shows a three-dimensional plot of $G_{mag1}$ with respect to x and φ in accordance with an embodiment of the present invention.

It can be seen from FIG. 4 that the highest possible value of $G_{mag1}$ is achieved when x=1 and $\phi=\pm\pi$; this value will be denoted by $G_{mag(max)}$ and is equal to:

$$G_{mag(max)} = (2U-1) + 2\sqrt{U(U-1)} \quad (15)$$

Figure 5:
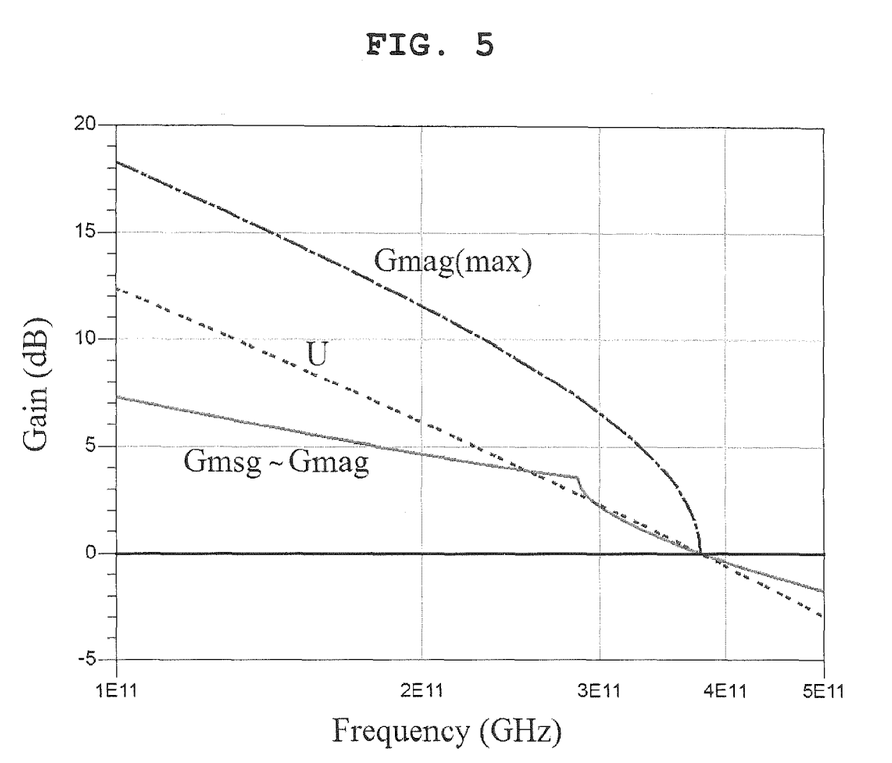
FIG. 5 shows an exemplary plot of $G_{msg}$-$G_{mag}$, U, and $G_{mag(max)}$ versus frequency in accordance with an embodiment of the present invention.

In the limit of U approaching infinity, $G_{mag(max)} \approx 4U$, in other words $G_{mag(max)}$ is approximately 6 dB higher than U. $G_{mag1}$ equals $G_{mag(max)}$ when x=1 or k=1, which indicates that the amplifier is right at the margin of unconditional stability; and the phase of $$\frac{S_{21}}{S_{12}} = \frac{Y_{21}}{Y_{12}} = \frac{Z_{21}}{Z_{12}}$$

is $\pm\pi$. A plot of $G_{msg}\sim G_{mag}$, U, and $G_{mag(max)}$ with frequency is shown in FIG. 5.

The above analysis suggests that by controlling the values of k and $\phi$, we can boost the intrinsic Maximum Available Gain of the transistor to the highest possible value $(2U-1)+2\sqrt{U(U-1)}$. The two conditions for gain boosting are:

$$k=1, \quad (16a)$$

$$\phi = \pm\pi. \quad (16b)$$

The first condition 16a indicates that the highest possible $G_{mag(max)}$ is obtained when the transistor is on the edge of stability. When k increases, in other words when the transistor is more unconditionally stable, $G_{mag}$ decreases from $G_{mag(max)}$. The second condition 16b means that $$A = \frac{S_{21eq}}{S_{12eq}} = \frac{Y_{21eq}}{Y_{12eq}} = \frac{Z_{21eq}}{Z_{12eq}}$$

is a real and negative number. From the first condition 16a and equation 8, −A is then equal to the boosted gain, i.e. the highest possible gain $G_{mag(max)}$. As long as this is true, i.e. $-A = G_{mag(max)} = (2U-1) + 2\sqrt{U(U-1)}$, the conditions 16a and 16b are automatically satisfied. Therefore, by controlling only the value of A, the conditions for gain boosting can be obtained.

When k=1, the optimal input and output reflection coefficients for simultaneous conjugate matching are located on the circumference of the Smith chart, which means simultaneous conjugate matching is not feasible since the amplifier is right at the border between stability and instability. As a result, it is recommended that an additional step should be taken to make k higher than 1. For example, some parameter, e.g. |A|, can be slightly modified so that k remains higher than 1 at the target frequency to facilitate simultaneous conjugate matching. Accordingly, the Maximum Available Gain that can be achieved will be slightly less than $G_{mag(max)}$.

Figure 6:
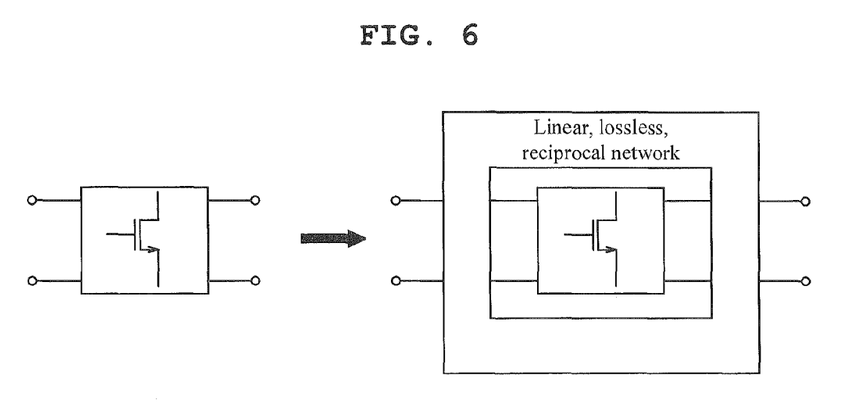
FIG. 6 illustrates a procedure of embedding the transistor into a linear, lossless, reciprocal network to achieve the desired value of A in accordance with an embodiment of the present invention.

The gain-boosting technique comprises following steps:
1. First, find the value of Mason's Invariant U from equation 9 using the intrinsic Z-parameters of the transistor.
2. Calculate the value of $G_{mag(max)}$, which is equal to −A or $(2U-1)+2\sqrt{U(U-1)}$.
3. Decrease the value of |A| until k is slightly higher than 1, according to equation 10.
4. Find a linear, lossless, reciprocal network embedding the transistor such that $$\frac{S_{21eq}}{S_{12eq}} = \frac{Y_{21eq}}{Y_{12eq}} = \frac{Z_{21eq}}{Z_{12eq}}$$

(wherein $S_{12eq}$ and $S_{21eq}$ represent S-parameters of the linear, lossless, reciprocal network embedding the transistor, $Y_{12eq}$ and $Y_{21eq}$ represent Y-parameters of the linear, lossless, reciprocal network embedding the transistor, and $Z_{12eq}$ and $Z_{21eq}$ represent Z-parameters of the linear, lossless, reciprocal network embedding the transistor) equals the value of A found from the previous step, as shown in FIG. 6.
5. Construct simultaneous conjugate matching for the input and output.

Figure 7:
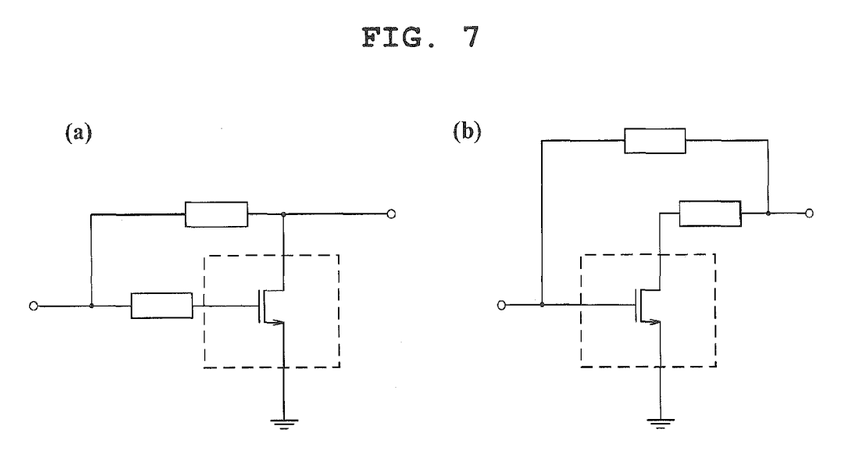
FIG. 7 illustrates two exemplary networks to construct the gain-boosting technique in accordance with an embodiment of the present invention.

As a result, there are numerous networks that can be used to boost the gain. FIG. 7 illustrates two of such networks. Here, the embedding networks are composed of two lossless, passive components. Considering each component as an individual 2-port network with its own Y-parameters, the equivalent Y-parameters of the circuit can be determined using the knowledge of cascade and parallel connections of 2-port networks, as described next.

Figure 8:
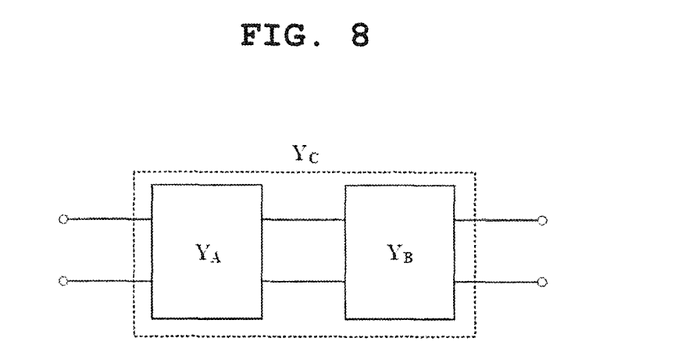
FIG. 8 illustrates the cascade connection of two 2-port networks in accordance with an embodiment of the present invention.

When two 2-port networks are connected in cascade as shown in FIG. 8, the equivalent Y-parameters are given as:

$$Y_{11C} = Y_{11A} - \frac{Y_{12A}Y_{21A}}{Y_{22A} + Y_{11B}} \quad (17a)$$

$$Y_{12C} = -\frac{Y_{12A}Y_{12B}}{Y_{22A} + Y_{11B}} \quad (17b)$$

$$Y_{21C} = -\frac{Y_{21A}Y_{21B}}{Y_{22A} + Y_{11B}} \quad (17c)$$

$$Y_{22C} = Y_{22B} - \frac{Y_{12B}Y_{21B}}{Y_{22A} + Y_{11B}} \quad (17d)$$

Figure 9:
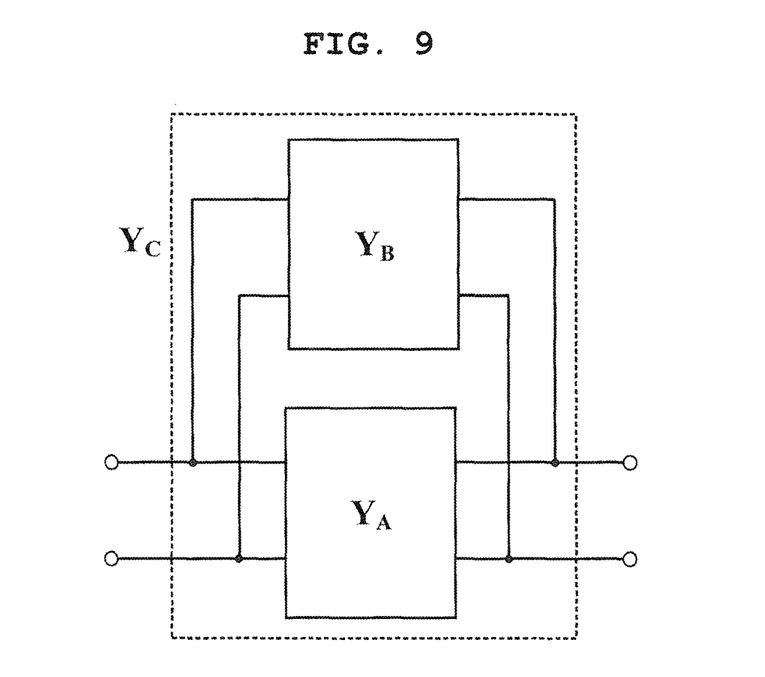
FIG. 9 illustrates the parallel connection of two 2-port networks in accordance with an embodiment of the present invention.

For the parallel connection of two 2-port networks in FIG. 9, the equations are straightforward. The equivalent Y-parameters are the sum of the Y-parameters of each individual network:

$$Y_{11C} = Y_{11A} + Y_{11B} \quad (18a)$$

$$Y_{12C} = Y_{12A} + Y_{12B} \quad (18b)$$

$$Y_{21C} = Y_{21A} + Y_{21B} \quad (18c)$$

$$Y_{22C} = Y_{22A} + Y_{22B} \quad (18d)$$

Each lossless, passive component can be an inductor, a capacitor, or a transmission line.

For a capacitor with capacitance C:

$$\begin{bmatrix} Y_{11} & Y_{12} \\ Y_{21} & Y_{22} \end{bmatrix} = \begin{bmatrix} j\omega C & -j\omega C \\ -j\omega C & j\omega C \end{bmatrix} \quad (19)$$

For an inductor with inductance L:

$$\begin{bmatrix} Y_{11} & Y_{12} \\ Y_{21} & Y_{22} \end{bmatrix} = \begin{bmatrix} -\dfrac{j}{\omega L} & \dfrac{j}{\omega L} \\ \dfrac{j}{\omega L} & -\dfrac{j}{\omega L} \end{bmatrix} \quad (20)$$

For a transmission line with characteristic impedance $Z_0$, propagation constant $\gamma$, and length l:

$$\begin{bmatrix} Y_{11} & Y_{12} \\ Y_{21} & Y_{22} \end{bmatrix} = \begin{bmatrix} \dfrac{1}{Z_0}\coth(\gamma l) & \dfrac{1}{Z_0}\left(-\dfrac{1}{\sinh(\gamma l)}\right) \\ \dfrac{1}{Z_0}\left(-\dfrac{1}{\sinh(\gamma l)}\right) & \dfrac{1}{Z_0}\coth(\gamma l) \end{bmatrix} \quad (21)$$

Finally, from the knowledge of the equivalent Y-parameters, the embedding network can be implemented such that $Y_{21}/Y_{12}$ is equal to the desired value of A, which is $-[(2U-1)+2\sqrt{U(U-1)}]$.

Figure 10:
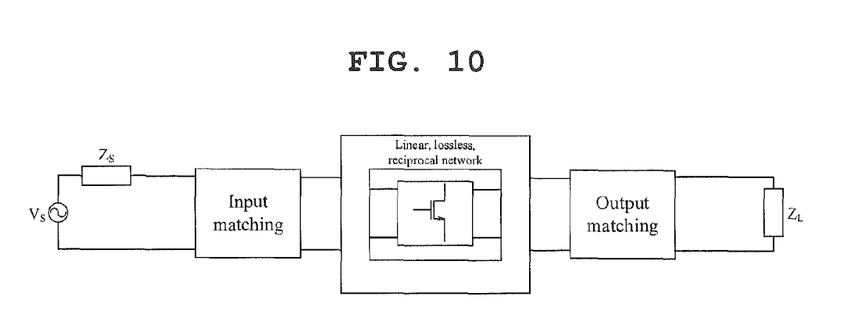
FIG. 10 illustrates the final complete amplifier circuit with the gain-boosting technique in accordance with an embodiment of the present invention.

As there are other possible gain-boosting networks, depending on specific constraints associated with the amplifier circuit, e.g. noise figure, number of components, area, etc. a particular network can be chosen to construct the gain-boosting technique. The final complete amplifier circuit with the gain-boosting technique will include the input and output matching circuits, as shown in FIG. 10.

Figure 11:
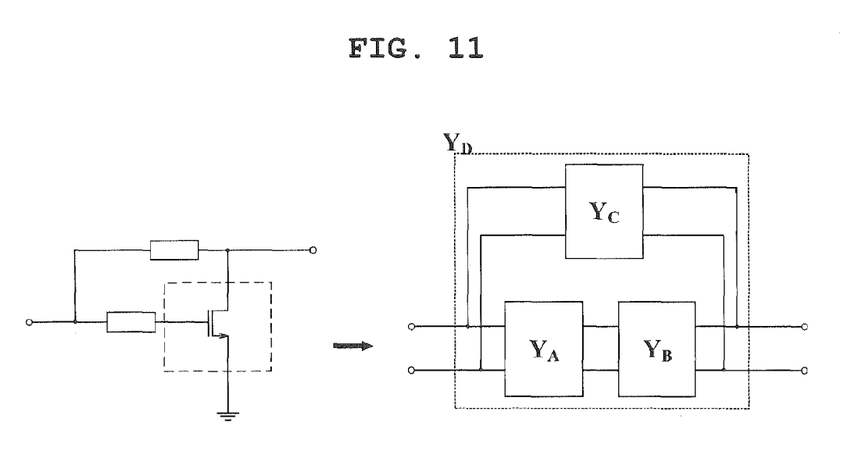
FIG. 11 illustrates an equivalent model of a transistor embedded into a gain-boosting network in accordance with an embodiment of the present invention.

FIG. 11 is another embodiment of the present invention. A gain-boosting network can be composed of two lossless, passive components as shown in FIG. 11, such that the final equivalent Y-parameters of the whole circuit are given as:

$$Y_{11D} = Y_{11A} - \frac{Y_{12A}Y_{21A}}{Y_{22A} + Y_{11B}} + Y_{11C} \quad (22a)$$

$$Y_{12D} = -\frac{Y_{12A}Y_{12B}}{Y_{22A} + Y_{11B}} + Y_{12C} \quad (22b)$$

$$Y_{21D} = -\frac{Y_{21A}Y_{21B}}{Y_{22A} + Y_{11B}} + Y_{21C} \quad (22c)$$

$$Y_{22D} = Y_{22B} - \frac{Y_{12B}Y_{21B}}{Y_{22A} + Y_{11B}} + Y_{22C} \quad (22d)$$

Then solving the equation $Y_{21D}/Y_{12D} = -[(2U-1)+2\sqrt{U(U-1)}]$ will give the Y-parameters of each of the two lossless, passive components. These components will then be implemented using capacitors, inductors, or transmission lines.

What is claimed is:

1. A method of designing a high frequency amplifier, comprising the steps of:

finding intrinsic Z-parameters of a transistor;

finding the Maximum Unilateral Gain or Mason's Invariant U of the transistor;

calculating $G_{mag(max)}$ which satisfies the condition: $(2U-1)+2\sqrt{U(U-1)}=-A$;

decreasing the value of |A| from the previous step until the stability factor k is slightly higher than 1, according to the equation:

$$U = \frac{\left|\dfrac{S_{21}}{S_{12}} - 1\right|^2}{2k\left|\dfrac{S_{21}}{S_{12}}\right| - 2\operatorname{Re}\left(\dfrac{S_{21}}{S_{22}}\right)};$$

designing a linear, lossless, reciprocal network embedding the transistor such that $$\frac{S_{21}}{S_{12}} = \frac{Y_{21}}{Y_{12}} = \frac{Z_{21}}{Z_{12}}$$

equals the value of A from the previous step;

embedding the transistor into the linear, lossless, reciprocal network; and constructing simultaneous conjugate matching, wherein $S_{12}$ and $S_{21}$ represent S-parameters of the transistor and $S_{12eq}$ and $S_{21eq}$ represent S-parameters of the linear, lossless, reciprocal network embedding the transistor, $Y_{12eq}$ and $Y_{21eq}$ represent Y-parameters of the linear, lossless, reciprocal network embedding the transistor, and $Z_{12eq}$ and $Z_{21eq}$ represent Z-parameters of the linear, lossless, reciprocal network embedding the transistor.

2. The method of claim 1, further comprising, before finding intrinsic Z-parameters of a transistor, measuring the S-parameters of the transistor and converting the S-parameters into Z-parameters or Y-parameters.

3. The method of claim 1, further comprising the step of designing input and output matching networks for simultaneous conjugate matching to the linear, lossless, reciprocal network embedding the transistor.

4. The method of claim 1, wherein the linear, lossless, reciprocal network is a combination of at least two lossless, passive components selected from the group consisting of capacitor, inductor, and transmission line.

5. The method of claim 4, wherein the linear, lossless, reciprocal network can be designed using Y-parameters of cascade and parallel connections of two lossless, passive components.

6. The method of claim 5, wherein a capacitor with capacitance C has Y-parameters as follows:

$$\begin{bmatrix} Y_{11} & Y_{12} \\ Y_{21} & Y_{22} \end{bmatrix} = \begin{bmatrix} j\omega C & -j\omega C \\ -j\omega C & j\omega C \end{bmatrix}.$$

7. The method of claim 5, wherein an inductor with inductance L has Y-parameters as follows:

$$\begin{bmatrix} Y_{11} & Y_{12} \\ Y_{21} & Y_{22} \end{bmatrix} = \begin{bmatrix} -\dfrac{j}{\omega L} & \dfrac{j}{\omega L} \\ \dfrac{j}{\omega L} & -\dfrac{j}{\omega L} \end{bmatrix}.$$

8. The method of claim 5, wherein a transmission line with characteristic impedance $Z_0$, propagation constant $\gamma$, and length l has Y-parameters as follows:

$$\begin{bmatrix} Y_{11} & Y_{12} \\ Y_{21} & Y_{22} \end{bmatrix} = \begin{bmatrix} \dfrac{1}{Z_0}\coth(\gamma l) & \dfrac{1}{Z_0}\left(-\dfrac{1}{\sinh(\gamma l)}\right) \\ \dfrac{1}{Z_0}\left(-\dfrac{1}{\sinh(\gamma l)}\right) & \dfrac{1}{Z_0}\coth(\gamma l) \end{bmatrix}.$$

\* \* \* \* \*

UNITED STATES PATENT AND TRADEMARK OFFICE
CERTIFICATE OF CORRECTION

PATENT NO. : 9,461,600 B2  
APPLICATION NO. : 14/590253  
DATED : October 4, 2016  
INVENTOR(S) : Lee et al.

Page 1 of 2

It is certified that error appears in the above-identified patent and that said Letters Patent is hereby corrected as shown below:

In the Specification

Column 5, Line 2, the equation

" $G_{mag}{}^2 - G_{mag}[Ux^2 - 2x\,\cos(\varphi)(U-1) + U] + x^2 = 0$ "

should be changed to

-- $G_{mag}^2 - G_{mag}[Ux^2 - 2xcos(\varphi)(U-1) + U] + x^2 = 0$ --;

Column 5, Line 40, the equation " $\dfrac{S_{21}}{S_{12}} = \dfrac{Y_{21}}{Y_{12}} = \dfrac{Z_{21}}{Z_{12}}$ "

should be changed to -- $\dfrac{S_{21eq}}{S_{12eq}} = \dfrac{Y_{21eq}}{Y_{12eq}} = \dfrac{Z_{21eq}}{Z_{12eq}}$ --;

In the Claims

Column 8, Claim 1, Line 15, the equation " $U = \dfrac{\left|\dfrac{S_{21}}{S_{12}} - 1\right|^2}{2k\left|\dfrac{S_{21}}{S_{12}}\right| - 2Re\left(\dfrac{S_{21}}{S_{22}}\right)}$ "

Signed and Sealed this  
Twenty-fifth Day of July, 2017

Joseph Matal  
*Performing the Functions and Duties of the  
Under Secretary of Commerce for Intellectual Property and  
Director of the United States Patent and Trademark Office*

CERTIFICATE OF CORRECTION (continued)
U.S. Pat. No. 9,461,600 B2 should be changed to -- $$U = \frac{\left|\frac{S_{21}}{S_{12}} - 1\right|^2}{2k\left|\frac{S_{21}}{S_{12}}\right| - 2Re\left(\frac{S_{21}}{S_{12}}\right)}$$ --;

Column 8, Claim 1, Line 25, the equation " $\frac{S_{21}}{S_{12}} = \frac{Y_{21}}{Y_{12}} = \frac{Z_{21}}{Z_{12}}$ "

should be changed to -- $\frac{S_{21eq}}{S_{12eq}} = \frac{Y_{21eq}}{Y_{12eq}} = \frac{Z_{21eq}}{Z_{12eq}}$ --.